United States Patent [19]

Isacoff et al.

[11] Patent Number: 4,537,683
[45] Date of Patent: Aug. 27, 1985

[54] TRIHALOMETHANE PRECURSOR REMOVAL USING ION EXCHANGE EMULSIONS

[75] Inventors: Eric G. Isacoff, Richboro; James W. Neely, Dresher, both of Pa.

[73] Assignee: Rohm and Haas Company, Philadelphia, Pa.

[21] Appl. No.: 553,225

[22] Filed: Nov. 18, 1983

Related U.S. Application Data

[63] Continuation-in-part of Ser. No. 482,684, Apr. 6, 1983, abandoned, which is a continuation-in-part of Ser. No. 344,584, Feb. 1, 1982, abandoned.

[51] Int. Cl.$^3$ .............................................. C02F 1/42
[52] U.S. Cl. .................................. 210/667; 210/672; 210/778; 210/908
[58] Field of Search .............. 210/665, 667, 683, 685, 210/692, 778, 908

[56] References Cited

U.S. PATENT DOCUMENTS 4,200,695 4/1980 Chong et al. .......................... 521/28
4,385,996 5/1983 McCarthy .............................. 210/908

OTHER PUBLICATIONS

Mazo, et al., "Sorption of Humic Acids by Ion Exchange Resin Powder", *Tr. Voronezh Univ.*, 1971, (No. 82), pp. 173-175.

*Primary Examiner*—Ivars Cintins
*Attorney, Agent, or Firm*—John E. Taylor, III

[57] ABSTRACT

To avoid formation of toxic trihalomethanes in drinking waters disinfected with halogens, these waters are treated with fine-particle-size ion exchange resin particles, optionally in the presence of a metal salt coagulant, to remove the trihalomethane precursors prior to halogenation.

15 Claims, 1 Drawing Figure

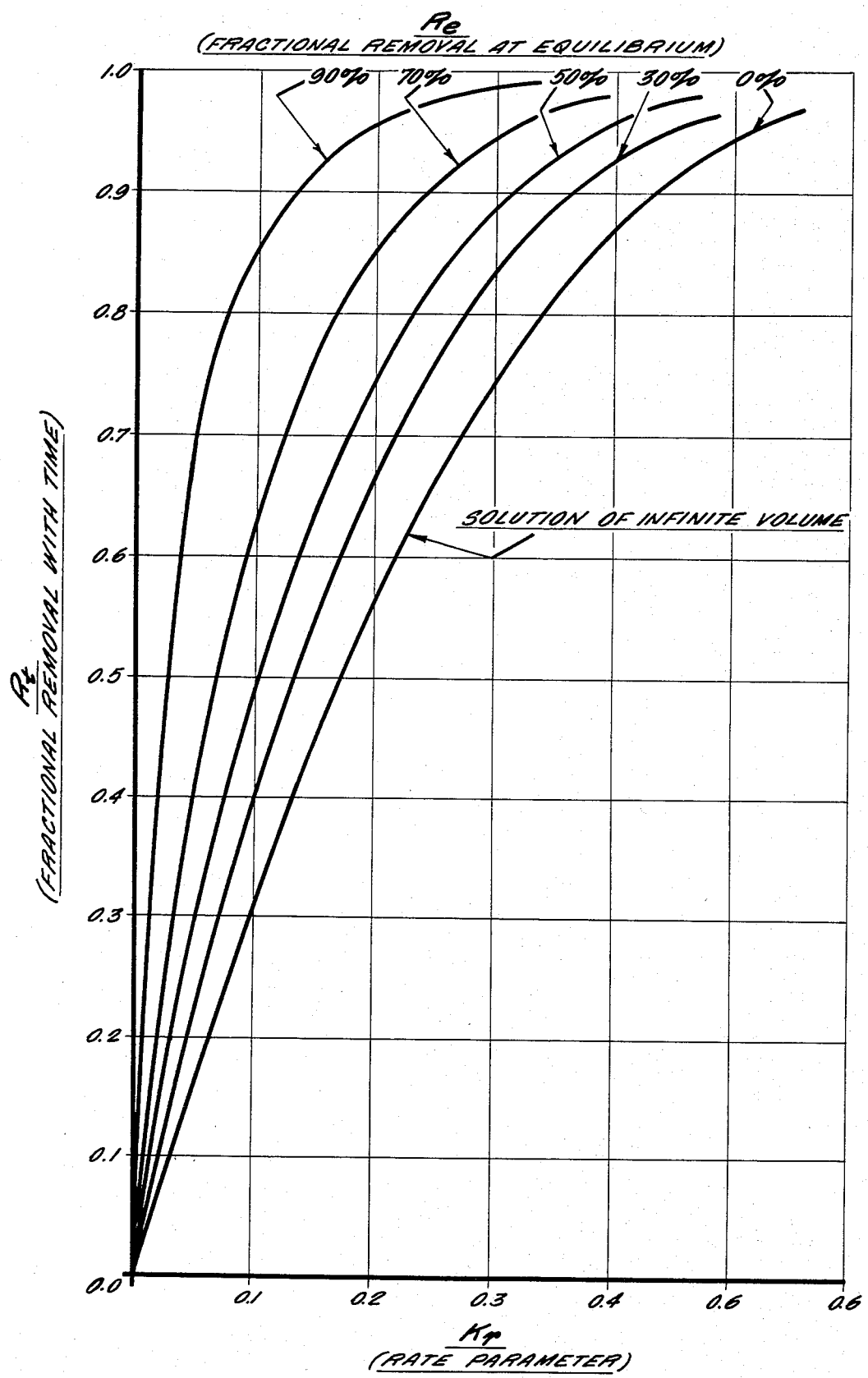

TRIHALOMETHANE PRECURSOR REMOVAL USING ION EXCHANGE EMULSIONS

This application is a continuation-in-part of Ser. No. 482,684, filed Apr. 6, 1983 now abandoned, which is, in turn, a continuation-in-part of Ser. No. 344,584, filed Feb. 1, 1982, now abandoned.

BACKGROUND OF THE INVENTION

The ubiquitous use of chlorine as a disinfectant in public water supplies has introduced a subtle health hazard of its own. Chlorine has been shown to react with humic substances present in such waters to produce trihalomethanes (THM) such as chloroform. The Environmental Protection Agency has identified trihalomethanes as carcinogens in animals, and has published a maximum contaminant level of 0.10 mg/liter (100 ppb) for total THM in community water systems (National Interim Primary Drinking Water Regulations; Control of Trihalomethanes in Drinking Water; Final Rules. U.S. Environmental Protection Agency, *Federal Register*, Vol. 44, No. 231, Nov. 29, 1979).

Attempts at removing trihalomethanes from chlorinated drinking water have met with but limited success. If THM is removed, but residual chlorine and humic substances remain, the THM will re-form. If the active chlorine is removed, as with granular activated charcoal, the water must be re-chlorinated to meet standards, and THM again may re-form.

An alternative approach is to remove the humic substances that are THM precursors. These substances, generally weak acids, are found in many natural waters, are probably leached from organic materials found in soil, and are usually found at high concentrations in surface waters, and at lower concentrations in most ground waters. Materials that previously have been used for removing them from water include adsorbents such as granular activated carbon, coagulants such as alum and ferric sulfate, and conventional ion exchange resins, including both strongly and weakly basic anion exchange resins. With strongly basic resins the affinity for these humic substances is so strong that regeneration of the resin is frequently a problem.

Each of these processes shares the problem that relatively large amounts of treating agents must be added to the drinking water to effectively reduce the THM precursor levels to below permissible limits. In addition, each possesses additional problems of its own, some of which are described above.

Accordingly, an object of the present invention is to minimize the amount of treating agent that must be added to water to significantly reduce its THM precursor content. Another object is to remove THM precursors in a way that does not interfere with conventional drinking water disinfectant processes. Additional objects will become apparent upon consideration of the following disclosure.

THE INVENTION

We have discovered a process for removing the precursors of trihalomethane from water, and especially from drinking water containing such trihalomethane precursors, which comprises treating the water with fine-particle-size ion exchange resin having a minimum equilibrium constant for THM removal, and a minimum mass-transfer coefficient defining the rate at which the THM-removal equilibrium is reached. The ion exchange particles may be anion exchange particles alone, or anion exchange particles combined with fine-particle-size cation exchange particles in the form of a floc. These ion exchange particles are surprisingly effective in removing THM precursors, and are effective at surprisingly low concentrations. Highly effective treatment levels for removal of THM from drinking water are from about 1 to about 50 milligrams per liter of water (mg/l); the preferred level is about 25 mg/l or less, preferably about 20 mg/l or less, more preferably about 15 mg/l or less, and still more preferably about 10 mg/l or less.

A convenient process by which water such as drinking water may be treated according to the process of the present invention is to introduce the anion exchange resin in the form of an emulsion, or to introduce a water-suspended floc of the anion and cation exchange resins, into the water prior to the settling and filtration treatment normally given to waters during purification for drinking purposes.

It is beneficial to combine coagulant treatment and treatment with the anion exchange resin. Coagulant treatment is a well-known water treatment process; the coagulants used are similarly well known and include soluble polyelectrolytes, which may be cationic, anionic or nonionic polyelectrolytes, including polyacrylic acid and soluble, polymeric quaternary amines. The coagulants may also be metal salts, including the sulfates and chlorides of aluminum, ferrous and ferric iron, magnesium carbonate and aluminum silicates including clays. Other coagulants will be apparent to those skilled in the art. The coagulant treatment may occur prior to, simultaneous with, or subsequent to treatment with the anion exchange resin; it should preferably occur prior to any filtration step.

In the absence of a coagulant or flocculant that will flocculate any excess anion exchange resin, either present in the water prior to treatment or introduced as described above, the resin may pass through subsequent filters and produce turbidity. Treatment with a soluble anionic flocculant or fine-particle-size cation exchange resin may be necessary to prevent this turbidity. The conventional settling and filtration step removes the flocculated resin, and with it the THM precursors, from the water. Chlorination or other disinfectant processes may be applied at any point during the water treatment, but desirably the disinfectant should be introduced subsequent to treatment with, and more desirably subsequent to removal of, the ion exchange resins. Chlorination prior to treatment with the ion exchange resin allows the THM precursors to react with the chlorine prior to their removal, thus defeating the purpose of the present process, and chlorination prior to removal of the ion exchange resin allows the resin itself to react with the chlorine. The consequence of the latter reaction is unknown, but inasmuch as it introduces chlorinated organic materials to the drinking water, it is considered undesirable.

In the ion exchange particles useful in the process of the present invention, the level of ion exchange functionality surprisingly has only a limited effect on the ability of these particles to remove THM precursors, and resins with as few as about 0.2 functional groups per monomer unit have almost the same effectiveness in THM precursor removal as those with one functional group per monomer unit. The preferred range of functionality of these resins is from about 0.1 to about 1.5 functional groups per monomer unit, a more preferred range is from about 0.2 to about 1.5 functional groups per monomer unit, and a still more preferred range is from about 0.2 to about 0.55 functional groups per monomer unit. Such ion exchange resins may be prepared as finely divided microbeads, according to the teachings of U.S. Pat. No. 4,200,695, which is hereby incorporated into the present disclosure by reference, or they may be prepared by comminuting conventional anion exchange resin beads, so long as the resin possesses the requisite equilibrium parameter for THM removal, and the requisite kinetic parameter, both of which are described below.

Resins suitable for use in the present invention include those prepared by functionalizing emulsion copolymers, and those prepared by copolymerizing monomers which include at least one monomer containing anion exchange functional groups, preferably amine functional groups. The latter process produces anion exchange resins directly, without the need for a subsequent functionalization step, although the amine-containing resins are frequently quaternized to convert weakly basic anion exchange resins to strongly basic ones. These processes are known to the skilled practitioner.

We have discovered that the removal of THM precursors with fine-particle-size anion exchange resins is not a straightforward ion exchange process following readily predictable resin behavior as it has been understood in the past, nor is it analogous to the conventional removal of organic materials by strongly basic anion exchange beads of commercial size. For instance, with conventional ion exchange, the higher the ion-exchange capacity a resin has, the better is its performance in general. By contrast, comparison of THM precursor removal versus anion exchange capacity of 9 resins having a capacity range of 2.8–11 meq/g gave correlation coefficients of 0.05–0.15 depending upon resin concentration. Total strong-base capacity correlated slightly better, with a correlation coefficient of 0.22–0.35, again depending upon resin concentration.

Similarly, typical contact times between the liquid stream and an ion exchange resin in a conventional resin bed are in the order of four minutes; this is adequate time for good exchange. Typically, under such conditions, 40–50% of a strong-base resin's theoretical capacity is utilized for a typical resin bead of 500 μm diameter. If the bead size is reduced, utilization of the resin's theoretical capacity should rise sharply, until at about 62.5 μm diameter a contact time of 4 minutes should produce almost total utilization of capacity, and further reduction in bead size would have little effect. Conversely, if contact time for a 500 μm bead is increased to 24 minutes, utilization of the strong-base resin's capacity should increase to above 95%. What is actually observed, however, when the size of the 9 resins (from 0.11 to 2.73 μm) is related to THM precursor removal, is a correlation coefficient of 0.18 to 0.11, depending upon resin concentration. A further, and startling, observation is that complete utilization of resin capacity may require extremely long times; even with resins as small as 1 μm diameter, complete equilibration may require a week ($1\times 10^4$ minutes) or longer.

The resin parameters that do correlate well with THM precursor removal are an equilibrium parameter, $K_e$, which essentially defines the resin capacity for THM precursors, and a kinetic parameter, $K_k$, which essentially defines the rate at which the resin tends to reach equilibrium. When these parameters, which are discussed more fully below, are combined and compared with THM precursor removal, the correlation coefficient varies from 0.5 to above 0.6, depending upon the resin concentration.

FIG. I is a graph showing the relationship between the fractional removal of THM precursors with time, $R_t$, and the rate parameter, $K_r$, for various values of the fractional removal of THM precursors at equilibrium, $R_e$. This graph may be used directly for determination of $K_r$ during the calculation of the kinetic parameter, $K_k$, described below.

The values of $K_e$ and $K_k$ are calculated from the moisture content of the resin being evaluated, which is determined as described below; the skeletal density of the resin, determined by helium densitometry; the particle diameter, either by microscopic measurement or by other standard methods of determining the average diameter of fine particles; and the THM precursor removal with time, which is described fully below. The values of $K_e$ for resins which are operable in the process of the present invention are about $6\times 10^5$ cm$^3$/g or greater, preferably about $7\times 10^5$ cm$^3$/g or greater, more preferably about $8\times 10^5$ cm$^3$/g or greater, and most preferably from about $8\times 10^5$ to about $10\times 10^5$ cm$^3$/g. The values of $K_k$ for resins operable in the process of the present invention are about 6 sec$^{-1}$ or greater, preferably about 7 sec$^{-1}$ or greater, more preferably from about 8 sec$^{-1}$ to about 12 sec$^{-1}$, and still more preferably from about 8 sec$^{-1}$ to about 10 sec$^{-1}$. The combined values of $K_e$ and $K_k$ for resins that are useful in the process of the present invention are expressed as a unitless number according to the calculation $K_e/10^5 + K_k$, and lie between about 13 and about 22, preferably between about 15 and about 22, and more preferably between about 16 and about 20.

It should be noted that $K_e$ does not depend upon ion exchange capacity alone, as does the equivalent parameter for conventional ion exchange, but appears to additionally involve the polymer network. The value of $K_k$ depends not only upon resin structure and porosity, but upon particle size as well, so that the value of $K_k$ for a given resin may be increased somewhat by decreasing the particle size.

The procedure for determining these two parameters requires that several characteristics of the resin be determined experimentally. The moisture holding capacity of the resin, identified as $C_m$ in the calculations, is determined, using whole beads of the same resin in the case of comminuted resins, and a whole bead of conventional size with the same type of polymer, level of crosslinking and functionalization in the case of emulsion-polymerized resins, by the following procedure:

Water-saturated resin is transferred to a Buchner funnel and drained with suction for about 5 minutes Three to five grams of the resin is weighed accurately, oven dried at 110° C. for 8 hours, cooled in a desiccator and reweighed. The moisture holding capacity is determined from the following calculation:

$$C_m = \left(1 - \frac{\text{Dried Wt.}}{\text{Wet Wt.}}\right) \times 100$$

Skeletal density, $\rho_s$, is determined by helium densitometry according to the article by W. C. Schumb and E. S. Rittner, "A Helium Densitometer for Use with Powdered Materials", *Journal of the American Chemical Society*, Vol. 65, Sept. 1943, pp. 1692–1695.

The average particle diameter is determined by microscopy or any other standard method for the average particle diameter of fine-particle-size materials.

From the above values the bulk density, $\rho_b$, and porosity, $\epsilon$, may be calculated according to the following:

$$\epsilon = \frac{1}{\frac{1}{\rho_s}\left(\frac{1}{C_m} - 1\right) + 1}$$

and $$\rho_b = \rho_s(1 - \epsilon) + \epsilon(\rho \text{ water})$$

These values for the resin will be used in later calculations.

Determination of Equilibrium and Kinetic Parameters

The behavior of the resin with respect to a water sample containing THM precursors is determined according to the following procedure:

Two 1800-ml portions of water containing THM precursors are treated with 5.0 and 10.0 mg/liter, respectively, of the resin to be evaluated, and a conventional coagulating aid (about 10–50 mg/l of metallic aid such as ferric sulfate and/or 0.1–1 mg/l of anionic polymer) is added to each portion to improve floc properties. The containers are shaken continuously, and 50-ml aliquots are withdrawn from each portion at intervals of 5, 30, 90, 180 and 260 minutes and once daily thereafter, for 30 days, with the minutes from the initial resin addition being recorded for each aliquot. Immediately upon withdrawal the aliquot is filtered and chlorinated, using the level of chlorination found from the "jar test", described below, to give the desired 0.1–1.5 ppm excess chlorine, and is allowed to stand in the dark for 24 hours. The chlorinated sample is then treated with 0.25 ml of 0.1N sodium thiosulfate and the THM formed is determined using a gas-liquid chromatograph with electron-capture detector, direct injection of the aqueous sample, and similar injection of aqueous chloroform standards.

From the results on the jar test, calculate the equilibrium constant, $K_e$:

$$K_e = \frac{V_s(C_{so} - C_{s\infty})}{W(C_{s\infty})}$$

where $V_s$ is the total volume of solution treated (ml)
W is the weight of resin added to the solution (g)
$C_{so}$ is the initial THM precursor concentration of the solution (g/l)
$C_{s\infty}$ is the final THM precursor concentration of the solution (g/l)

Calculate the fractional removal at equilibrium, $R_e$:

$$R_e = \frac{C_{so} - C_{s\infty}}{C_{so}}$$

For the aliquot taken at each time interval, calculate the fractional removal with time, $R_t$ $$R_t = \frac{C_{so} - C_s}{C_{so} - C_{s\infty}}$$

where $C_s$ is the concentration of THM precursor in the individual aliquot.

From FIG. 1 determine the rate parameter, $K_r$, for each aliquot, using the values calculated above for $R_t$ and $R_e$, interpolating between the curves most closely approaching the calculated value of Re.

Calculate the diffusion coefficient, $K_d$, for each aliquot:

$$K_d = \frac{(K_r)^2\left(1 + \left[\frac{(1-\epsilon)\rho_s K_e}{\epsilon}\right]\right) r^2}{t}$$

where r is the radius of the average resin particle (cm) and t is the time from addition of the resin to sampling of the aliquot (sec).

Calculate the value for $K_k$ as follows:

$$K_k = \frac{60 K_d \epsilon}{\rho b\, d^2}$$

where d is the average resin particle diameter (cm).

The following examples are intended to illustrate the present invention, but not to limit it except as it is limited in the claims. All reagents used are of good commercial quality, and all percentages and other proportions are by weight, unless otherwise indicated.

In the following examples, samples of raw water were treated according to the process of the present invention, and for comparative purposes, according to conventional processes. Raw water was collected from the Delaware River at Philadelphia, Pa., filtered through a coarse screen, and subsequently filtered through glass wool prior to testing. Raw water was sampled by the U.S. Environmental Protection Agency from the Ohio River at Cincinnati, Ohio, and from the Preston Water Treatment Plant at Hialeah, Fla.; these samples were tested as supplied.

"Jar Test" Determination of THM Precursor Removal

The experimental procedure used was similar for each of the following examples. For the small-scale examples the "jar test" was performed as follows:

The material to be tested was added to 800 ml of the specified test water in a 1000-ml beaker. The ion exchange resins were added as aqueous suspensions containing 6.25% solids, and the other THM-precursor removers were added as dry solids. The water containing the THM-precursor removers to be tested was stirred for 5 minutes at 100 rpm using a Phipps and Bird jar test apparatus, and for an additional 20 minutes at 30 rpm, after which the water was allowed to stand undisturbed while the solids settled. At 30 and 60 minutes during the settling period the turbidity of the water was determined using a Hellige Turbidimeter and APHA Method No. 163b (APHA Standard Methods, 13th edition, 1971); if a sample containing the anion exchange resin still showed turbidity after 60 minutes of settling, a small amount of cation exchange resin was added to flocculate the excess anion exchange resin. Subsequent to the settling period the water samples were filtered using Whatman #1 filter paper.

Several 50-ml samples of the treated, filtered water were chlorinated to different levels of chlorine, using an approximately 4000-6000 ppm stock solution of chlorine gas dissolved in water; these chlorinated samples were allowed to stand in the dark for 24 hours, after which they were analyzed for chlorine spectrophotometrically using APHA Method No. 114 g (APHA Standard Methods, 13th edition, 1971), to determine the sample containing a residual chlorine content of 0.1-1.5 ppm chlorine after 24 hours. The sample containing this specified amount of chlorine after 24 hours was treated with 0.25 ml of 0.1N sodium thiosulfate to reduce the free chlorine and prevent further chlorination during analysis. The THM formed during the 24-hour period was determined using a gas-liquid chromatograph with electron-capture detector, direct injection of the aqueous sample, and similar injection of aqueous chloroform standards.

Examples 1-29, the results of which are given in Table 1, illustrate the removal of THM precursors, as evidenced by the reduction in THM following overnight chlorination, by a strongly basic anion exchange resin of the present invention, with particle size below 1 $\mu$m and narrow size distribution, in the hydroxyl form. In Examples 1-10 and 23-29 the tested waters were samples of Delaware River water, in Examples 11-16 they were settled Ohio River water, and in Examples 17-22 they were raw waters from the Preston Water Treatment Plant in Hialeah, Fla.

TABLE 1

| Example | Treatment Level (mg/l) | THM Content ($\mu$g/l) Treated | THM Content ($\mu$g/l) Control | % THM Reduction |
|---|---|---|---|---|
| 1 | 1 | 66 | 100 | 34.0 |
| 2 | 3 | 54 | 100 | 46.0 |
| 3 | 5 | 44 | 100 | 56.0 |
| 4 | 7 | 32 | 100 | 68.0 |
| 5 | 9 | 25 | 100 | 75.0 |
| 6 | 1 | 124 | 138 | 10.1 |
| 7 | 3 | 70.6 | 138 | 50.7 |
| 8 | 5 | 36.1 | 138 | 73.8 |
| 9 | 7 | 34.9 | 138 | 74.7 |
| 10 | 9 | 30.2 | 138 | 78.1 |
| 11 | 2 | 120 | 148 | 18.9 |
| 12 | 5 | 84 | 148 | 43.2 |
| 13 | 10 | 87 | 148 | 41.2 |
| 14 | 15 | 67 | 148 | 54.7 |
| 15 | 20 | 55 | 148 | 62.8 |
| 16 | 25 | 56 | 148 | 62.1 |
| 17 | 2 | 340 | 600 | 43.3 |
| 18 | 5 | 360 | 600 | 40.0 |
| 19 | 10 | 319 | 600 | 46.8 |
| 20 | 15 | 242 | 600 | 59.7 |
| 21 | 20 | 232 | 600 | 61.3 |
| 22 | 25 | 176 | 600 | 70.7 |
| 23 | 7.8 | 35 | 148 | 76.2 |
| 24 | 15.7 | 25 | 148 | 82.8 |
| 25 | 23.5 | 29 | 148 | 80.4 |
| 26 | 31.3 | 37 | 148 | 75.0 |
| 27 | 39.1 | 20 | 148 | 86.4 |
| 28 | 31.3 | 32 | 87 | 63.6 |
| 29 | 62.5 | 34 | 87 | 63.1 |

Examples 30-34, the results of which are given in Table 2, illustrate the removal of trihalomethane precursors from Delaware River water samples by a strongly basic ion exchange resin of the present invention, with particle size below 1 $\mu$m and with narrow size distribution, in the chloride form.

TABLE 2

| Example | Treatment Level (mg/l) | THM Content ($\mu$g/l) Treated | THM Content ($\mu$g/l) Control | % THM Reduction |
|---|---|---|---|---|
| 30 | 1 | 124 | 136 | 8.8 |
| 31 | 3 | 52.6 | 136 | 61.3 |
| 32 | 5 | 25.1 | 136 | 81.5 |
| 33 | 7 | 23.1 | 136 | 82.8 |
| 34 | 9 | 19.1 | 136 | 85.9 |

Examples 35-39, the results of which are given in Table 3, illustrate the removal of trihalomethane precursors from Delaware River water with a floc of the present invention formed by mixing the strongly basic ion exchange resin of Examples 1-29 with a strongly acidic ion exchange resin, of particle size below 1 $\mu$m and with narrow size distribution.

TABLE 3

| Example | Treatment Level (mg/l) | THM Content ($\mu$g/l) Treated | THM Content ($\mu$g/l) Control | % THM Reduction |
|---|---|---|---|---|
| 35 | 50 | 72 | 110 | 34.7 |
| 36 | 100 | 64 | 110 | 41.7 |
| 37 | 62.5 | 58 | 87 | 32.8 |
| 38 | 125 | 62 | 87 | 28.4 |
| 39 | 250 | 52 | 87 | 40.5 |

Example 40 illustrates the removal of trihalomethane precursors from Delaware River water with a mixture of 10 mg/l of ferric sulfate (a known coagulant) and 9 mg/l of the strongly basic ion exchange resin of the present invention having particle size below 1 $\mu$m and narrow size distribution. Examples 41-45 illustrate, for comparative purposes, the removal of trihalomethane precursors from Delaware River water by ferric sulfate alone. The results of Examples 40-45 are given in Table 4.

TABLE 4

| Example | Treatment Level (mg/l) | THM Content ($\mu$g/l) Treated | THM Content ($\mu$g/l) Control | % THM Reduction |
|---|---|---|---|---|
| 40 | 10 + 9 | 16 | 71 | 77.5 |
| 41 | 10 | 65 | 71 | 8.5 |
| 42 | 20 | 48 | 71 | 32.4 |
| 43 | 30 | 36 | 71 | 49.3 |
| 44 | 40 | 31 | 71 | 56.3 |
| 45 | 50 | 26 | 71 | 63.4 |

Examples 46-54, the results of which are given in Table 5, illustrate for comparative purposes the removal of trihalomethane precursors from Delaware River water by conventional treatment with alum, or aluminum sulfate-16 hydrate.

TABLE 5

| Example | Treatment Level (mg/l) | THM Content ($\mu$g/l) Treated | THM Content ($\mu$g/l) Control | % THM Reduction |
|---|---|---|---|---|
| 46 | 10 | 36 | 51 | 29 |
| 47 | 15 | 34 | 51 | 33 |
| 48 | 20 | 27 | 51 | 47 |
| 49 | 30 | 25 | 51 | 51 |
| 50 | 40 | 23 | 51 | 55 |
| 51 | 50 | 34 | 87 | 60.9 |
| 52 | 50 | 25 | 148 | 83.2 |
| 53 | 50 | 49 | 110 | 55.1 |
| 54 | 100 | 41 | 110 | 63.1 |

Examples 55 and 56, the results of which are given in Table 6, illustrate for comparative purposes the removal of trihalomethane precursors from Delaware River water by conventional treatment with activated charcoal (Pittsburgh RC Pulverized Grade, obtained from Calgon Corporation).

TABLE 6

| Example | Treatment Level (mg/l) | THM Content (µg/l) Treated | THM Content (µg/l) Control | % THM Reduction |
|---|---|---|---|---|
| 55 | 50 | 79 | 110 | 28.5 |
| 56 | 100 | 42 | 110 | 61.9 |

Examples 57-61, the results of which are given in Table 7, illustrate for comparative purposes the removal of trihalomethane precursors from Delaware River water by treatment with soluble cationic polymers (Betz 1175). These examples are included to compare the effectiveness of low level treatment with the insoluble ion exchange resins of the present invention with similar ionic, but soluble, materials which have been previously used for removal of anionic materials from water.

TABLE 7

| Example | Treatment Level (mg/l) | THM Content (µg/l) Treated | THM Content (µg/l) Control | % THM Reduction |
|---|---|---|---|---|
| 57 | 5 | 168 | 176 | 4.5 |
| 58 | 10 | 122 | 176 | 30.6 |
| 59 | 15 | 91.9 | 176 | 47.7 |
| 60 | 20 | 84.5 | 176 | 51.1 |
| 61 | 25 | 40.4 | 176 | 77.0 |

Using the same procedures above, but using different resins, Examples 62-76 were performed. In the preceding examples and following Examples 62-64, the emulsion resin used was a styrene-based copolymer crosslinked with divinylbenzene, chloromethylated, aminated and quaternized according to the procedures set forth in U.S. Pat. No. 4,200,695. In the rest of the following examples the resins are prepared according to the procedures set forth in the same U.S. patent, but they differ in composition as follows:

The resins used in Examples 65-70 were styrene-based copolymers crosslinked with divinylbenzene and functionalized by copolymerizing a functional-group-bearing monomer with the above monomers. The resin used in Examples 65-67 contained 48% by weight, based on the total weight of the monomers, of dimethylaminoethyl methacrylate, which incorporated an average of approximately 0.38 functional amine groups per monomer unit into the polymer. The resin of Example 68-70 contained 60%, on the basis described above, of dimethylaminoethyl methacrylate, or an average of approximately 0.5 functional amine groups per monomer unit. The resin used in Examples 71-73 was a copolymer of methyl methacrylate crosslinked with divinylbenzene and functionalized subsequent to polymerization with dimethylaminopropyl methacrylate to a level of approximately 0.22 functional groups per monomer unit, based on the original copolymer. The resin used in Examples 74-76 was functionalized by polymerizing 47% by weight, based on the total weight of monomers, of dimethylaminoethyl methacrylate with methyl methacrylate and the crosslinking monomer ethylene glycol dimethacrylate, to produce a resin having an average of approximately 0.41 functional groups per monomer unit.

The tested waters for Examples 62-76 were raw water samples from Daytona Beach, Fla.; when chlorinated without treatment, according to the procedure described above, the water used in Examples 62-70 contained 387 µg/l of trihalomethanes, and that used in Examples 71-76 contained 399 µg/l of trihalomethanes (i.e., these are the "control" values analogous to those so labeled in Tables 1-7).

Table 8 gives the results of Examples 62-76, which illustrate the effectiveness of resins having relatively low functionality (Examples 65-76) compared with a resin having a functionality about the same as those of Examples 1-61 (Examples 62-64), when used to treat similar water samples.

TABLE 8

| Example | Trihalomethane Treatment Level (mg/l) | Content of Treated Water (µg/l) | % THM Reduction |
|---|---|---|---|
| 62 | 5 | 173 | 55.2 |
| 63 | 10 | 149 | 61.5 |
| 64 | 15 | 115 | 70.3 |
| 65 | 5 | 189 | 51.1 |
| 66 | 10 | 166 | 57.1 |
| 67 | 15 | 134 | 65.5 |
| 68 | 5 | 181 | 53.2 |
| 69 | 10 | 155 | 59.9 |
| 70 | 15 | 125 | 67.7 |
| 71 | 5 | 205 | 48.6 |
| 72 | 10 | 181 | 54.6 |
| 73 | 15 | 163 | 59.2 |
| 74 | 5 | 190 | 52.4 |
| 75 | 10 | 165 | 58.6 |
| 76 | 15 | 149 | 62.6 |

Examples 77-85 show the correlation between $K_e$, $K_k$ and effectiveness for removing THM precursors for nine different resins. Table 9 describes the resins used, and Table 10 shows the results of treating filtered, raw water (containing approximately 450 µg/l THM after chlorination) with the nine resins.

TABLE 9

| Resin | Resin Description |
|---|---|
| A | Quaternary amine functionalized, styrene-divinylbenzene gellular copolymer. 1.8% crosslinker, Anion Exchange Capacity (AEC) = 3.8 meq/g dry, particle diameter = 0.22µ ± 0.02. |
| B | Quaternary amine functionalized, styrene-divinylbenzene, aminoalkylmethacrylate gellular copolymer. 5% crosslinker, AEC = 2.8 meq/g dry, particle diameter = 0.11µ ± 0.02. |
| C | Quaternary amine functionalized, styrene-divinylbenzene porous copolymer. 3% crosslinker, AEC = 4.0 meq/g dry, median particle diameter = 1.1µ, particle diameter range = <0.4 to 5µ. |
| D | Quaternary amine functionalized, styrene-divinylbenzene highly porous copolymer. 3% crosslinker, AEC = 4.0 meq/g dry, median particle diameter = 1.1µ, particle diameter range = <0.4 to 10µ. |
| E | Quaternary amine functionalized, styrene-divinylbenzene, slightly porous gellular copolymer. AEC = 4.0 meq/g dry, median particle diameter = 1.1µ, particle diameter range = <0.4 to 10µ. |
| F | Quaternary amine functionalized, styrene-divinylbenzene gellular copolymer. 3.8% crosslinker, AEC = 4.0 meq/g dry, median particle diameter = 0.66µ, particle diameter range = <0.4 to 2.0µ. |
| G | Quaternary amine functionalized, styrene- |

TABLE 9-continued

| Resin | Resin Description |
|---|---|
| | divinylbenzene gellular copolymer. 4% cross-linker, AEC = 4.0 meq/g dry, median particle diameter = 2.7μ, particle diameter range = <0.4 to >30μ. |
| H | Tertiary amine-epichlorohydrin condensate gellular polymer. AEC = 11 meq/g dry, median particle diameter = 0.65μ, polydisperse particle size distribution. |
| I | Polyamine-phenol-formaldehyde porous polymer. AEC = 5.2 meq/g dry, median particle diameter = 0.44μ, polydisperse particle size distribution. |

TABLE 10

| Example | Resin | $K_e$ ($10^5$cm$^3$/g) | $K_k$ (sec$^{-1}$) | Resin Treatment Level (mg/l) | THM Reduction % |
|---|---|---|---|---|---|
| 77 | A | 8.07 | 8.75 | 5 | 62.8 |
| | | | | 10 | 68.9 |
| | | | | 15 | 74.5 |
| 78 | B | 6.88 | 6.03 | 5 | 59.3 |
| | | | | 10 | 69.4 |
| | | | | 15 | 73.1 |
| 79 | C | 8.45 | 8.70 | 5 | 65.1 |
| | | | | 10 | 71.2 |
| | | | | 15 | 77.6 |
| 80 | D | 7.48 | 6.34 | 5 | 58.0 |
| | | | | 10 | 67.0 |
| | | | | 15 | 75.0 |
| 81 | E | 8.35 | 8.79 | 5 | 54.1 |
| | | | | 10 | 61.9 |
| | | | | 15 | 74.7 |
| 82 | F | 7.08 | 8.16 | 5 | 41.3 |
| | | | | 10 | 48.0 |
| | | | | 15 | 54.5 |
| 83 | G | 7.36 | 4.26 | 5 | 27.2 |
| | | | | 10 | 33.3 |
| | | | | 15 | 39.8 |
| 84 | H | 6.20 | 3.91 | 5 | 45.1 |
| | | | | 10 | 47.2 |
| | | | | 15 | 50.0 |
| 85 | I | 6.20 | 4.07 | 5 | 27.2 |
| | | | | 10 | 31.7 |
| | | | | 15 | 37.0 |

As may be observed in the above table, the resins with values of $K_k$ outside the range considered operable for the process of the present invention (G, H and I) showed decidedly inferior performance in removing THM precursors, and those with marginal values of $K_e$ as well showed still poorer performance.

The resins operable in the process of the present invention show considerable effectiveness in color removal, as shown in Table 11. Color was determined for samples of raw water shaken with the indicated treatment levels of the indicated resins, according to the "jar test" described earlier. Color was measured subsequent to the filtration step but prior to the chlorination step, using platinum-colbalt color standards according to the test described in *APHA Standard Methods,* 14th edition, American Public Health Association, Washington, DC, 1975, Method No. 64.

TABLE 11

| Resin | Treatment Level (mg/l) | Raw Water Color | Color after Treatment |
|---|---|---|---|
| A | 5 | 24 | 10 |
| | 10 | 24 | 6 |
| | 15 | 24 | 4 |
| B | 2 | 27 | 13 |
| | 5 | 27 | 11 |
| | 10 | 27 | 10 |
| | 15 | 27 | 7 |
| C | 2 | 27 | 12 |
| | 5 | 27 | 9 |
| | 10 | 27 | 7 |
| | 15 | 27 | 8 |
| D | 5 | 24 | 11 |
| | 10 | 24 | 7 |
| | 15 | 24 | 3 |
| E | 5 | 24 | 11 |
| | 10 | 24 | 7 |
| | 15 | 24 | 4 |

I claim:

1. A process for removing trihalomethane precursors from water containing said precursors which comprises treating the water, at a rate of from about 1 to about 25 milligrams of resin per liter of water, with a fine-particle-size anion exchange resin having an equilibrium parameter of $K_e = 6 \times 10^5$ cm$^3$/g or greater, a kinetic parameter of $K_k = 6$ sec$^{-1}$ or greater, and a combined value of $K_e/10^5 + K_k$ of about 13 to about 22, and subsequently removing the resin from the water.

2. The process of claim 1 wherein the equilibrium parameter is $K_e = 7 \times 10^5$ cm$^3$/g or greater and the kinetic parameter is $K_k = 7$ sec$^{-1}$ or greater.

3. The process of claim 2 wherein the water is treated with the resin at a rate of 20 milligrams or less of resin per liter of water.

4. The process of claim 2 wherein the water is treated with the resin at a rate of about 15 milligrams or less of resin per liter of water.

5. The process of claim 2 wherein the water is treated with the resin at a rate of about 10 milligrams or less of resin per liter of water.

6. The process of claim 2 wherein the resin is removed from the water by filtration.

7. The process of claim 6 wherein removing the resin by filtration is facilitated by adding to the water, prior to filtration, a fine-particle-size cation exchange resin.

8. The process of claim 2 wherein the resin is introduced to the water in the form of an aqueous emulsion or suspension.

9. The process of claim 2 wherein the resin is introduced to the water in the form of a floc with a fine-particle-size cation exchange resin.

10. The process of claim 2 wherein the water is treated with the resin in the presence of a metal salt coagulant.

11. The process of claim 10 wherein the metal salt coagulant is a clay.

12. The process of claim 10 wherein the metal salt coagulant is ferric sulfate.

13. The process of claim 10 wherein the metal salt coagulant is present in the water at a level greater than about 5 milligrams per liter of water.

14. The process of claim 2 wherein the resin is in the hydroxyl form.

15. The process of claim 2 wherein the resin is in the halide form.

* * * * *